United States Patent
Speggiorin et al.

(10) Patent No.: US 9,851,624 B2
(45) Date of Patent: Dec. 26, 2017

(54) SUPPORT HEAD FOR VIDEO PHOTOGRAPHIC APPARATUS

(71) Applicant: LINO MANFROTTO + CO. S.p.A., Cassola (IT)

(72) Inventors: Paolo Speggiorin, Mussolente (IT); Matteo Parolin, Borso del Grappa (IT)

(73) Assignee: LINO MANFROTTO + CO. S.P.A., Cassola (VI) (IT)

( * ) Notice: Subject to any disclaimer, the term of this patent is extended or adjusted under 35 U.S.C. 154(b) by 0 days.

(21) Appl. No.: 15/313,703

(22) PCT Filed: May 26, 2015

(86) PCT No.: PCT/IB2015/053914
§ 371 (c)(1),
(2) Date: Nov. 23, 2016

(87) PCT Pub. No.: WO2015/181710
PCT Pub. Date: Dec. 3, 2015

(65) Prior Publication Data
US 2017/0123297 A1    May 4, 2017

(30) Foreign Application Priority Data
May 28, 2014   (IT) .............................. PD2014A0132

(51) Int. Cl.
*G03B 17/56*   (2006.01)
*F16M 11/24*   (2006.01)
(Continued)

(52) U.S. Cl.
CPC ............. *G03B 17/561* (2013.01); *F16H 1/16* (2013.01); *F16H 19/001* (2013.01);
(Continued)

(58) Field of Classification Search
CPC .................................................... G03B 17/561
See application file for complete search history.

(56) References Cited

U.S. PATENT DOCUMENTS 2,747,423 A * 5/1956 Sanders .................. B43L 13/06
74/396
3,109,617 A   11/1963 Meyer
(Continued)

FOREIGN PATENT DOCUMENTS

DE       102010036405 A1    1/2012

*Primary Examiner* — Clayton E Laballe
*Assistant Examiner* — Dennis Hancock
(74) *Attorney, Agent, or Firm* — Volpe and Koenig, P.C.

(57) ABSTRACT

A support head for video photographic apparatus is provided and includes: a base; an attachment element for the video photographic apparatus; at least one articulated joint formed between a first joint element and a second joint element designed to rotate the attachment element relative to the base about an axis of rotation of the head; an operating lever associated with the second joint element to rotate the second joint element relative to the first joint element; an actuator device including a first gear element, associated with the first joint element; and a second gear element, provided on the operating lever and capable of engaging with the first gear element to cause the first joint element to rotate relative to the second joint element about the axis of rotation as a result of the operation of the lever.

11 Claims, 3 Drawing Sheets

(51) Int. Cl.
*F16M 11/04* (2006.01)
*F16M 11/10* (2006.01)
*F16M 11/18* (2006.01)
*F16M 13/02* (2006.01)
*F16H 19/00* (2006.01)
*F16H 1/16* (2006.01)

(52) U.S. Cl.
CPC ............ *F16M 11/04* (2013.01); *F16M 11/10* (2013.01); *F16M 11/18* (2013.01); *F16M 11/242* (2013.01); *F16M 13/02* (2013.01); *F16H 2019/008* (2013.01); *F16M 2200/024* (2013.01)

(56) References Cited

U.S. PATENT DOCUMENTS

| | | | | |
|---|---|---|---|---|
| 5,589,903 | A * | 12/1996 | Speggiorin | F16M 11/105 248/663 |
| 2010/0148023 | A1* | 6/2010 | Speggiorin | F16M 11/041 248/187.1 |
| 2013/0108255 | A1 | 5/2013 | Vogt | |
| 2015/0286116 | A1* | 10/2015 | Johnson, Sr. | G03B 17/568 348/373 |

\* cited by examiner

SUPPORT HEAD FOR VIDEO PHOTOGRAPHIC APPARATUS

TECHNICAL FIELD

The present invention relates to a support head for video photographic apparatus, having the features stated in the preamble of the main claim.

BACKGROUND ART

In the technical field of support heads for video photographic apparatus, there are known heads in which the apparatus, when coupled to the head, can be oscillated with a high degree of precision about one or more axes of rotation defined on the head.

These heads comprise an adjustment mechanism, typically based on gearing, which causes the relative rotation of one or more components of the apparatus about one or more of the aforesaid axes. In particular, it is known a head comprising a first and a second body coupled together with the possibility of rotation about an axis of the head, and an adjustment mechanism which allows the user to cause this rotation by acting on an operating lever associated with one of the two bodies.

The adjustment mechanism typically comprises a reduction mechanism such that a rotation of the operating lever carried out by the user results in a rotation of much smaller angular amplitude of the first body relative to the second body.

Thus, it is possible to achieve extremely precise rotation of the apparatus, but, at the expense of the speed of rotation of the apparatus.

U.S. Pat. No. 5,589,903, in the name of the same Applicant, describes a support head comprising an adjustment mechanism allowing the user to disengage, when necessary, the gearing which engages the first body with the second body, in such a way that the rotation about the axis can take place freely without the need to rotate the operating lever. Thus the user can make a first very fast rotational movement to reach an approximate position, and then, having put the adjustment mechanism back into the engaged condition, can make a second, fine, rotational movement to reach the desired angular position in a precise way.

In the support head described in U.S. Pat. No. 5,589,903, the adjustment mechanism is disengaged by rotating an appropriate ring nut mounted coaxially on the operating lever, which moves the operating lever translationally away from a pinion mounted on the other body. The ring nut is rotated by the user in opposition to the elastic action of a spring which tends to keep the adjustment mechanism in mutual engagement.

However, the system described above has a few drawbacks, including the fact that it is less intuitive for the user, who, for example, receives no immediate indication of the direction in which the ring nut must be rotated to disengage the adjustment mechanism.

Moreover, in order to prevent the unbalancing of the weight of the apparatus due to the rotation that takes place about a non-vertical axis (for example, about the horizontal axes known as the level or the tilt axes) from causing an undesired movement of the operating lever, thereby disengaging the adjustment mechanism and causing the apparatus to fall by free rotation, the spring must have a relatively high elastic constant, to ensure that the adjustment mechanism is effectively kept in the engaged condition even in the presence of unbalanced loads.

However, this requires the user to make a considerable effort, both to rotate the ring nut and to keep it in the disengaged position against the elastic action of the spring.

DISCLOSURE OF THE INVENTION

The problem tackled by the present invention is that of providing a support head for video photographic apparatus, which is structurally and functionally designed to overcome, wholly or in part, at least one of the limitations described above with reference to the cited prior art.

This problem is solved by the present invention by means of a support head realized in accordance with the appended claims.

BRIEF DESCRIPTION OF THE DRAWINGS

The characteristics and advantages of the invention will be made clearer by the following detailed description of a preferred embodiment thereof, illustrated, for the purposes of guidance and in a non-limiting way, with reference to the attached drawings, in which.

PREFERRED EMBODIMENT OF THE INVENTION

Figure 1:
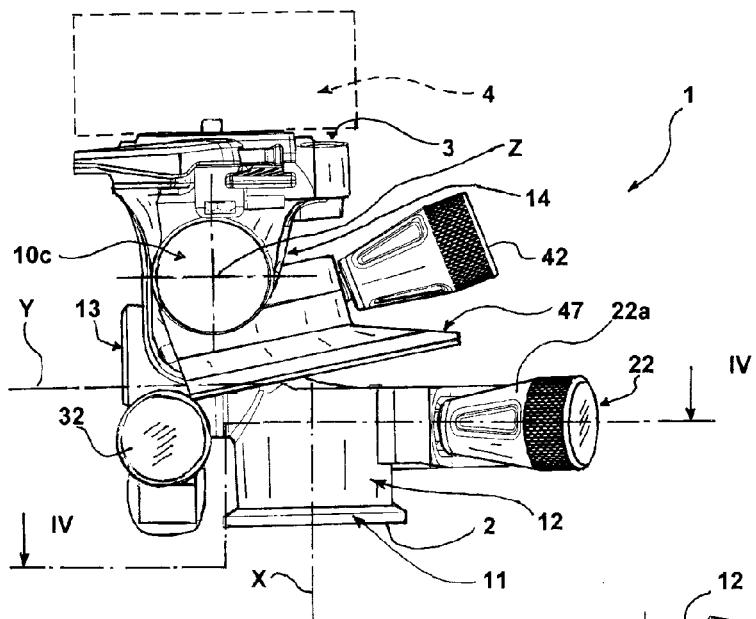
FIG. 1 is a schematic rear view of a support head for video photographic apparatus, realized in accordance with the present invention.
Figure 2:
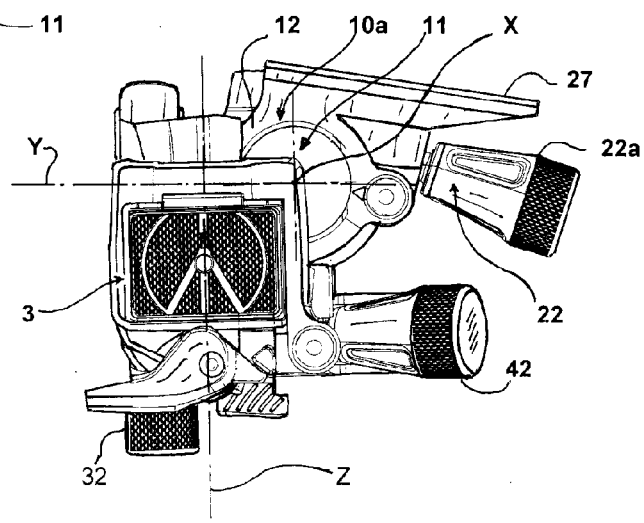
FIG. 2 is a schematic plan view from above of the support head of FIG. 1.
Figure 3:
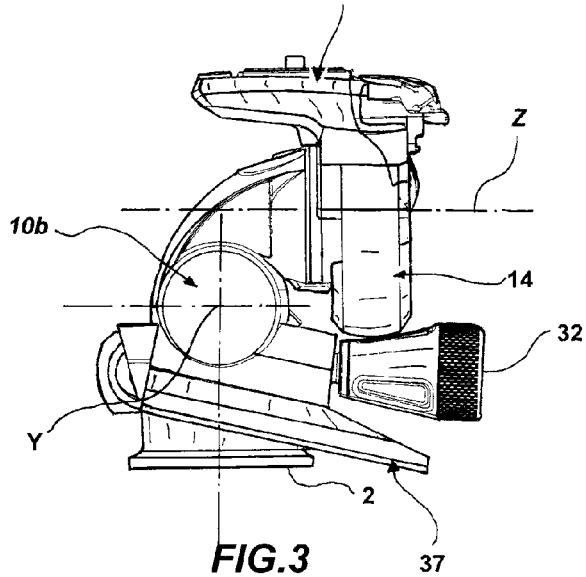
FIG. 3 is a schematic side view of the support head of FIG. 1.

In the figures, the number 1 indicates the whole of a support head for video photographic apparatus, made according to the present invention.

The head 1 comprises a base 2, forming a bearing plane of the head 1 and preferably designed to be mounted on a stand, such as a tripod, and an attachment element 3 capable of receiving and engaging with a piece of video photographic apparatus, indicated schematically by the number 4 in the figures.

The head 1 which is the subject of the preferred embodiment described herein is what is known as a three-axis head, in which the attachment element 3, and consequently the video photographic apparatus 4 engaged with it, can rotate relative to the base 2 about three axes of rotation which are independent of one another.

In particular, these axes are, respectively, an axis X, called the pan axis, passing through the base 2 in a manner substantially perpendicular thereto and capable of allowing the rotation of the apparatus 4 on a horizontal plane; an axis Y, called the tilt axis, perpendicular to the axis X and such that the apparatus 4 can rotate about an axis substantially perpendicular to the optical axis thereof; and, finally, an axis Z, called the level axis, perpendicular to both the axis X and the axis Y and capable of allowing the rotation of the apparatus 4 about an axis parallel to its optical axis.

To allow the attachment element 4 to rotate relative to the base 2 about the aforementioned axes, the head 1 comprises, for each of the axes, a respective articulated joint 10a, 10b and 10c.

For this purpose, the head 1 comprises:
a first body 11, on which the base 2 is formed,
a second body 12, coupled by mutual engagement to the first body 11 so as to rotate about the axis X, thereby forming the first joint 10a,
a third body 13, coupled by mutual engagement to the second body 12 so as to rotate about the axis Y, thereby forming the second joint 10b,
a fourth body 14, on which the attachment element 4 is provided, coupled by mutual engagement to the third body 13 so as to rotate about the axis Z, thereby forming the third joint 10c.

It should be noted that for each joint 10a, 10b and 10c a first and a second joint element can always be defined, these elements being represented, on different occasions, by the first body 11 and the second body 12, or by the second body 12 and the third body 13, or by the third body 13 and the fourth body 14.

The joint 10a between the first body 11 and the second body 12 is described in detail below; however, this joint is also representative of joints 10b and 10c when the first and second joint elements are appropriately identified, as specified in the preceding paragraph.

The first body 11 comprises a shaft 20, extending along the axis X, which is received in a seat 21 formed in the second body 12, so that the first body 11 is coupled to the second body 12 with the possibility of rotation about the axis X.

The second body 12 is associated with an operating lever 22, on a free end of which a knob 22a is provided.

The operating lever 22 is designed to cause the second body 12 to rotate relative to the first body 11 about the axis X.

In particular, the rotation between the first body 11 and the second body 12 is provided by means of an actuator device comprising a first gear element associated with the first body 11 and a second gear element provided on the operating lever 22.

In the preferred embodiment described herein, the first gear element includes a ring gear 23, with axial teeth, formed on the shaft 20, while the second gear element includes an endless screw 24, extending axially on the stem of the operating lever 22.

The endless screw 24 can engage with the ring gear 23 so that, when the operating lever 22 is rotated about its longitudinal axis, the endless screw 24 causes the ring gear 23, and consequently the shaft 20 and the first body 11, to rotate about the axis X.

Preferably, the gearing formed by the ring gear 23 and the endless screw 24 is constructed so as to form a gear reduction mechanism having a gear ratio in the range from 1:20 to 1:60, or preferably from 1:30 to 1:50, for example 1:38.

Thus one full revolution of the operating lever 22 about its longitudinal axis corresponds to about one thirty-eighth of a revolution of the second body 12 relative to the first body 11 about the axis X, so that the angular positioning of the two bodies 11 and 12 can be achieved with very high precision and uniformity of movement.

The operating lever 22 can also be moved away from the first body 11 in order to disengage the endless screw 24 from the ring gear 23 and allow the first body 11 to rotate freely relative to the second body 12 about the axis X.

According to one aspect of the present invention, the operating lever 22 is pivoted on the second body 12 so as to oscillate about a pivot axis T, and it is preferably pivoted at an end 25 longitudinally opposed to the knob 22a, so that the endless screw 24 is located in an intermediate position between the knob 22a and the end 25.

Preferably, the pivot axis T of the operating lever 22 is substantially parallel to the axis X, so that the operating lever 22, as a result of an oscillation about the pivot axis T, is movable away from or towards the shaft 20 of the first body 11 on a plane substantially coinciding with the plane of rotation of the first and second body 11 and 12.

The operating lever 22 is pivoted by housing the end 25 in a hole 28 formed in the second body 12 and locking it axially with a nut 29 screwed on to the lever. A pair of spring washers 30, fitted on the end 25, are also preferably interposed between the nut 29 and the second body 12.

The operating lever 22 is biased towards the first body 11 by an elastic element, for example a spring 26, so that the endless screw 24 is biased towards engagement with the ring gear 23.

In another aspect of the present invention, the second body 12 comprises a grip appendage 27, extending in a position adjacent to the operating lever 22 and spaced slightly apart from the lever, on the side opposite the shaft 20.

Figure 6:
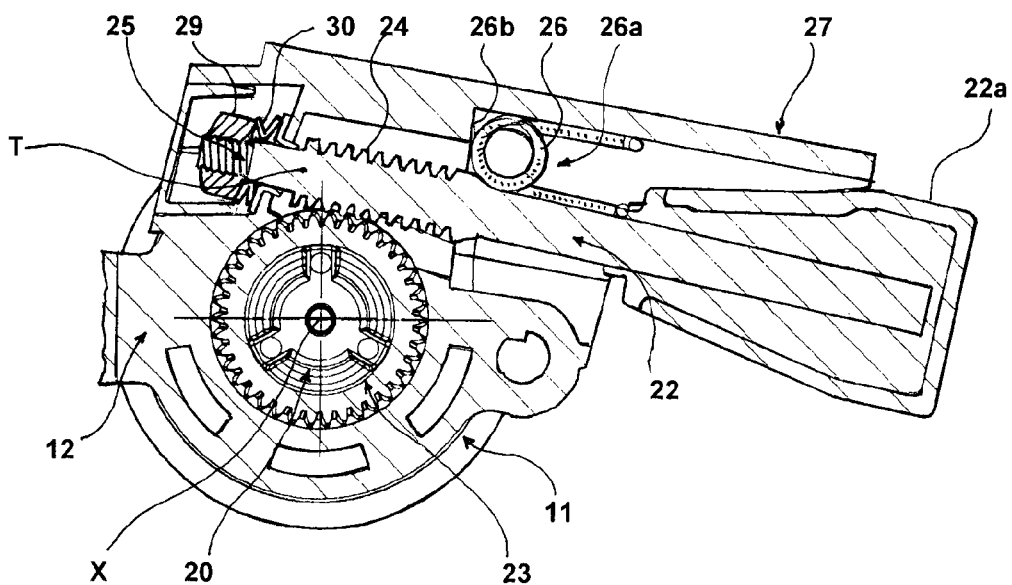
FIG. 6 is a sectional view, similar to FIG. 4, showing the support head in the operating configuration of FIG. 5, FIGS. 7a and 7b are front views of the support head of FIG. 1 with the video photographic apparatus oscillated into different positions.
Figure 5:
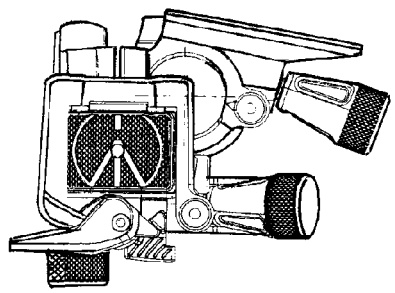
FIG. 5 is a schematic plan view from above of the support head of FIG. 1 in a second operating configuration.

Thus the operating lever 22 can be made to oscillate about the pivot axis away from the shaft 20 of the first body 11 in an effective and intuitive way, simply by simultaneously grasping the operating lever 22 and the grip appendage 27 with one hand and tightening his grasp so that the operating lever 22 is made to oscillate towards the grip appendage 27 (FIGS. 5 and 6).

The spring 26 preferably acts between the operating lever 22 and the grip appendage 27, in a position interposed between the operating lever 22 and the endless screw 24, so that it can effectively perform its action of pressing the endless screw 24 against the ring gear 23. It should be noted that, by positioning the spring 26 closer to the end 25 of the operating lever 22 than to the knob 22a, it is advantageously possible to make use of the length of the arm of the operating lever 22 to overcome the elastic force of the spring 26 more easily.

Preferably, the spring 26 is housed in a seat 26a formed within the grip appendage 27 and bears axially, on the one hand, against a shoulder 26b of the seat 26a, and, on the other hand, against the knob 22a.

The desired angular positioning of the video photographic apparatus 4 relative to the base 2 about the axis X can therefore be achieved by a first fast and approximate positioning movement, in which the operator presses the operating lever 22 against the grip appendage 27 by tightening his grasp, so as to disengage the endless screw 24 from the ring gear 23 and free the relative rotation between the first body 11 and the second body 12 about the axis X.

At the end of this initial fast movement, the operating lever 22 is released, in such a way that, because of the action of the spring 26, the endless screw 24 engages with the ring gear 23.

If necessary, therefore, the operator can adjust the angular positioning of the apparatus 4 more finely by rotating the operating lever 22 about its longitudinal axis in one or the other direction. The rotation of the operating lever causes the endless screw 24, the ring gear 23, and therefore the first body 11 to rotate simultaneously relative to the second body 12. Clearly, since the first body 11 is generally fixed relative to the ground, being mounted on a tripod or resting on a flat surface for example, it will be the second body 12 that rotates.

As stated above, the joints 10b and 10c are made in a similar way to the joint 10a, and the following elements can therefore be identified in them:

operating levers 32 and 42, associated respectively with the third body 13, for rotating the latter about the tilt axis Y, and with the fourth body 14, for rotating the latter about the level axis Z, and grip appendages 37 and 47 extending, respectively, from the third body 13 and from the fourth body 14 in a position adjacent to the operating levers 32 and 42.

In the construction of the joints 10b and 10c, there is also a supplementary aspect to be considered, which is not present in the joint 10a.

This is the fact that the rotation of the video photographic apparatus 4 about a non-vertical axis, such as the level axis Z and the tilt axis Y, causes an unbalancing of the weights relative to the normal position in which the video photographic apparatus 4 is positioned horizontally on top of the head 1, with its optical axis parallel to the horizontal plane (the "standard" position shown in FIG. 1).

When the video photographic apparatus 4 is inclined relative to this "standard" position, the weight of the apparatus, which may be considerable, tends to make it naturally rotate downwards.

This tendency, which is generally not present in rotation about the axis X, shall be effectively opposed by the adjustment mechanism for rotation about the axes Y and Z.

First of all, it should be noted that the structural configuration of the operating lever 22, 32 or 42 and its pivoting on the second joint element (the second, third, or fourth body 12, 13, or 14 respectively) is such that a direction of rotation called "self-releasing" and a direction of rotation called "self-locking" can be defined.

In the first case, any external couple of forces tends to move the operating lever 22 away from the ring gear 23, so that the endless screw 24 can disengage from the ring gear 23.

In the second case, however, the couple of forces tends to increase the force with which the ring gear 23 and the endless screw 24 are held together in mutual engagement.

The first event described above is evidently very undesirable, since it would allow free rotation to occur suddenly and unexpectedly between the first and second rotation elements. In particular, if the axes of rotation are the tilt or level axes, it would allow the video photographic apparatus 4 to fall downwards.

Figure 4:
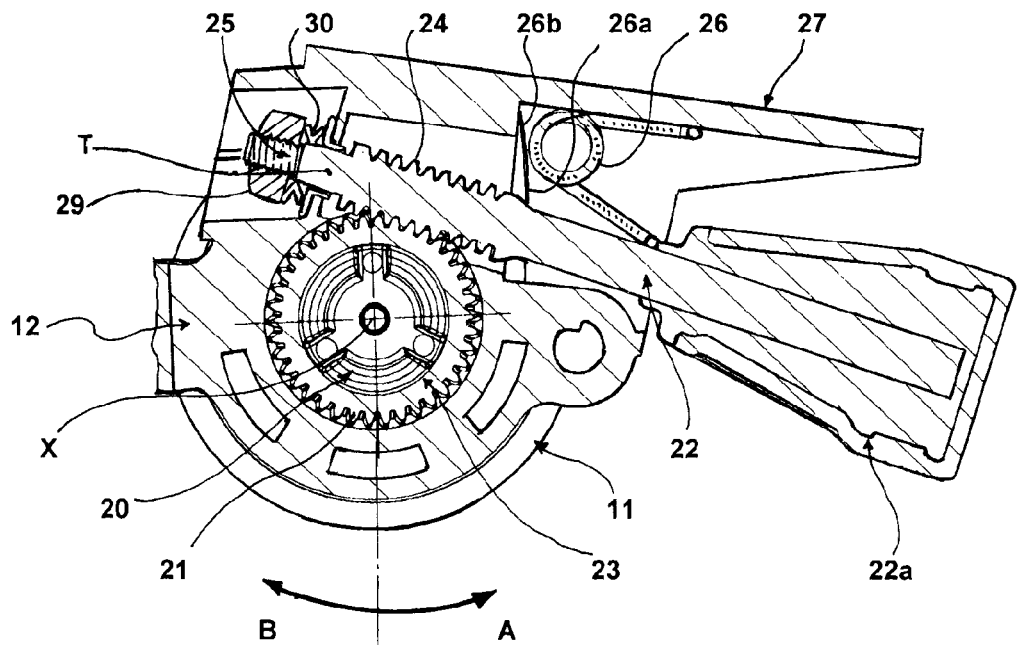
FIG. 4 is a sectional view along the broken line IV-IV of FIG. 1.

With reference to the joint 10a described in detail above, which has similarities with the joints 10b and 10c, the self-releasing direction of rotation is identified as the direction of rotation in which the second body 12 is rotated relative to the first body 11 in the opposite direction to the extension of the operating lever 22 (in the direction indicated from the knob 22a towards the end 25). In FIG. 4, the self-releasing direction of rotation of the second body 12 relative to the first body 11 is indicated by A, while the self-locking direction of rotation is indicated by B.

In a first embodiment, not shown in the attached figures, the head 1 comprises a safety element for locking the relative rotation of the first joint element and the second joint element about the corresponding axis of rotation, at least when they are rotated in the self-releasing direction of rotation A.

For example, an elastically biased pin may be provided on the second joint element to interfere with the oscillation of the operating lever 22, thus impeding its movement towards the grip appendage 27. Accordingly, this oscillation is allowed only after the operator has moved the pin (by pressing it, for example) against the action of a spring.

In another embodiment, which may be combined with the preceding one or used as an alternative thereto, a stop element is provided for each of the joints concerned, and is capable of limiting the rotation of the first joint element relative to the second joint element when it is oscillated in the self-releasing direction of rotation. In the present case, the stop element is provided in such a way that the oscillation in the self-releasing direction of rotation is limited to a reduced angle, of less than 20° for example, relative to the normal balanced position, so that the unbalancing of the weight of a piece of video photographic apparatus cannot move the operating lever away from the first joint element.

Figure 7A:
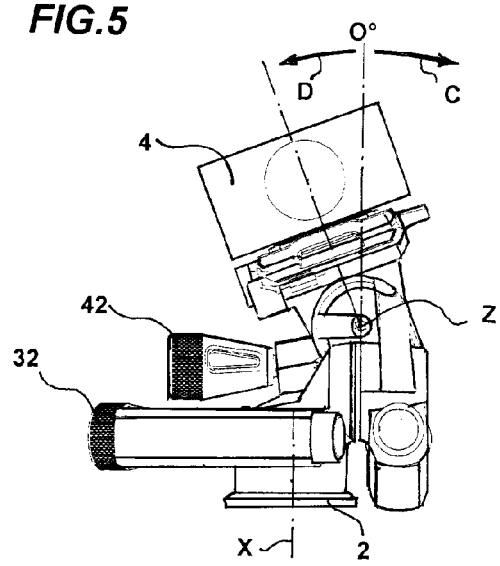
Figure 8A:
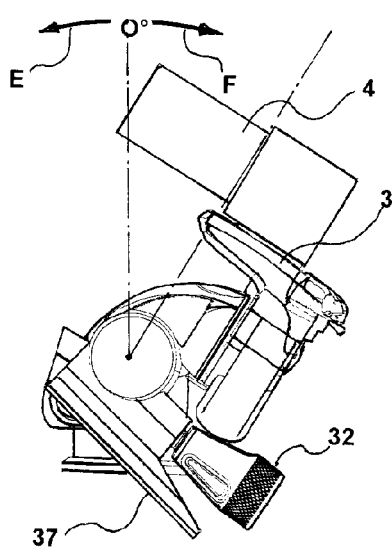
FIGS. 8a and 8b are side views of the support head of FIG. 1 with the video photographic apparatus oscillated into different positions.

In FIGS. 7a and 8a, the head 1 is shown with the video photographic apparatus 4 oscillated, respectively, about the axis Y and the axis Z, in the limit position defined by the stop element.

It is also known that, in rotation about the level or tilt axes (axes Z and Y respectively), a main direction of rotation is normally defined, but this is not present for rotation about the pan axis, since it must be possible to rotate the video photographic apparatus equally well in one or other direction.

It is specified that the main direction of rotation about an axis, in the context of the present description and the attached claims, is defined as the direction of rotation in which the video photographic apparatus can be oscillated to the greatest extent, through at least 45° in all cases.

Figure 7B:
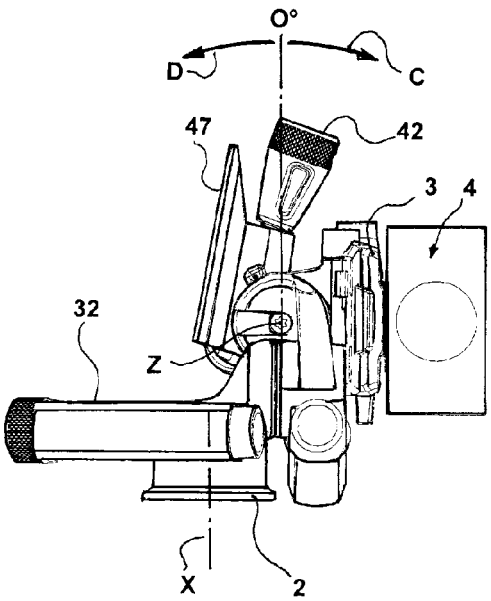

In the case of the level axis, the main direction of rotation allows the apparatus to oscillate from horizontal (the "pan" mode) to vertical (the "portrait" mode), and typically results in a direction of rotation that appears to be clockwise when the video photographic apparatus 4 is viewed from the front (see FIG. 7b). In FIGS. 7a and 7b, the main direction of rotation is indicated by C, while the other direction of rotation is indicated by D.

Figure 8B:
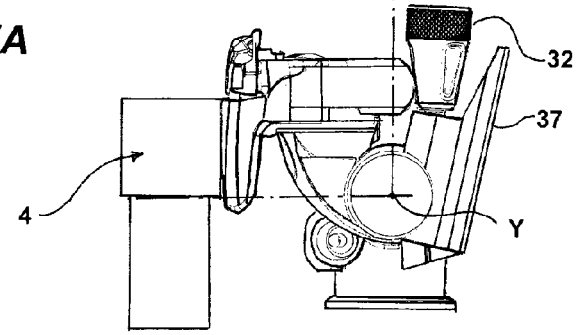

In the case of the tilt axis, the main direction of rotation allows the video photographic apparatus 4 to oscillate so that the lens points downwards. In FIGS. 8a and 8b, the main direction of rotation is indicated by E, while the other direction of rotation is indicated by F.

Preferably, in the support head 1, the operating levers 32 and 42 are positioned relative to the first and second joint elements in such a way that any main direction of rotation is a direction of rotation of the self-locking type.

Although in the preferred embodiment described above the support head comprises three separate joints to allow the video photographic apparatus to rotate about three axes, those skilled in the art will understand that the basic principle of the present invention is reproducible in a similar way on a support head having any number of joints and therefore any number of axes of rotation.

Thus the present invention resolves the problem identified above with reference to the cited prior art, while also offering numerous other benefits, including greater intuitiveness, greater safety and greater ease of use in the operation of free rotation of the joints, by comparison with the solution described in the cited prior art.

The invention claimed is:

1. A support head for video photographic apparatus, comprising:
   a base,
   an attachment element for the video photographic apparatus,
   at least one articulated joint formed between a first joint element and a second joint element designed to rotate the attachment element relative to the base about an axis of rotation (X; Y; Z) of the head,
   an operating lever associated with the second joint element to rotate the second joint element relative to the first joint element about the axis of rotation,
   an actuator device comprising a first gear element, associated with the first joint element, and a second gear element, provided on the operating lever and configured to engage with the first gear element to cause the first joint element to rotate relative to the second joint element about the axis of rotation as a result of the operation of the lever, wherein the operating lever is moveable from the first joint element to disengage the second gear element from the first gear element and allow the first joint element to rotate freely relative to the second joint element about the axis of rotation, the operating lever is pivoted on the second joint element so as to be movable from and towards the first joint element by oscillation about a pivot axis of the operating lever, and the second joint element comprises a grip appendage separate from and extending in a position adjacent to the operating lever, spaced apart from the lever, on a side opposite the first gear element, to facilitate the oscillation of the operating lever away from the first joint element by pressing the operating lever towards the grip appendage.

2. The support head according to claim 1, wherein the second gear element comprises an endless screw.

3. The support head according to claim 1, wherein the operating lever is rotatable about its longitudinal axis to cause the rotation of the second gear element.

4. The support head according to claim 1, wherein the second gear element and the first gear element have a gear ratio in the range from 1:20 to 1:60.

5. The support head according to claim 1, wherein a resilient element is provided to bias the operating lever towards the first joint element, so as to keep the first gear element engaged with the second gear element.

6. The support head according to claim 1, wherein the axis of rotation (X) is substantially perpendicular to the base, thereby defining a pan axis of the head.

7. The support head according to claim 1, wherein the axis of rotation (Y, Z) is substantially parallel to the base, thereby defining a level axis or a tilt axis of the head.

8. The support head according to claim 7, wherein a self-releasing direction of rotation (A) is defined for the axis of rotation, in said direction the unbalancing of the video photographic apparatus relative to its equilibrium position on the head tends to disengage the second gear element from the first gear element, and a safety element is provided to lock the relative rotation of the first joint element and the second joint element about the axis of rotation, at least when the first and second joint elements are rotated in the self-releasing direction of rotation.

9. The support head according to claim 7, wherein a self-releasing direction of rotation is defined for the axis of rotation, in which direction the unbalancing of the video photographic apparatus relative to its equilibrium position on the head tends to disengage the second gear element from the first gear element, and a stop element is provided to limit the rotation of the first joint element relative to the second joint element when the first joint element is oscillated in the self-releasing direction of rotation.

10. The support head according to claim 7, wherein a main direction of rotation is defined about the axis of rotation, and the operating lever is pivoted on the second joint element in such a way that the rotation of the first joint element in the main direction of rotation is self-locking, and the unbalancing of the video photographic apparatus relative to its equilibrium position on the head tends to promote the engagement of the second gear element with the first gear element.

11. The support head of claim 1, wherein the grip appendage and the operating lever have center axes that are generally parallel when the operating lever is pressed towards the grip appendage.

* * * * *